A. B. HOOVER.
MEANS FOR REWINDING THE FILMS OF MOTION PICTURE MACHINES.
APPLICATION FILED APR. 24, 1913.

1,113,633.

Patented Oct. 13, 1914.

Witnesses
Stuart Hilder.
Frances M Anderson

Inventor
A. B. Hoover
By E. W. Anderson & Son.
his Attorneys

UNITED STATES PATENT OFFICE.

ARCHIE B. HOOVER, OF PAOLA, KANSAS.

MEANS FOR REWINDING THE FILMS OF MOTION-PICTURE MACHINES.

1,113,633. Specification of Letters Patent. Patented Oct. 13, 1914.

Application filed April 24, 1913. Serial No. 763,314.

*To all whom it may concern:*

Be it known that I, ARCHIE B. HOOVER, a citizen of the United States, resident of Paola, in the county of Miami and State of Kansas, have made a certain new and useful Invention in Means for Rewinding the Films of Motion-Picture Machines; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1:
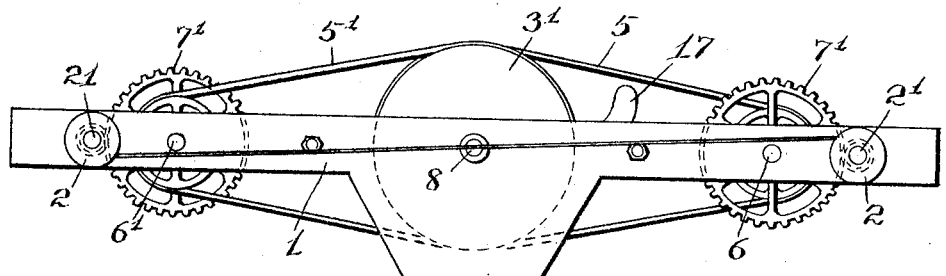
Figure 2:
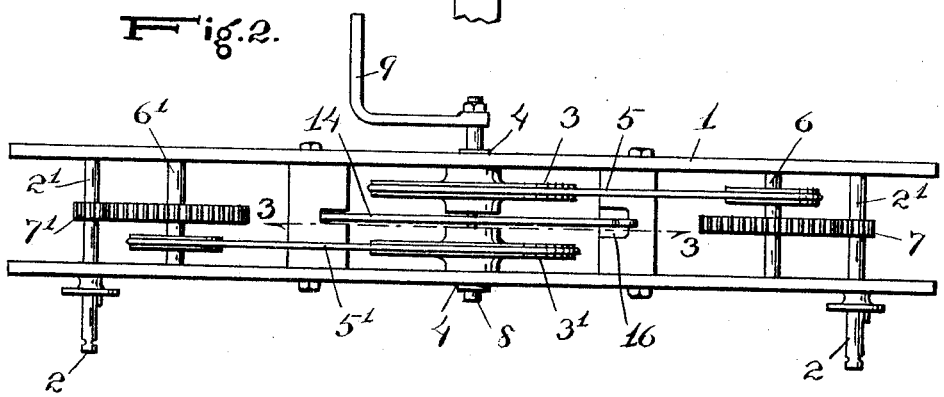
Figure 3:
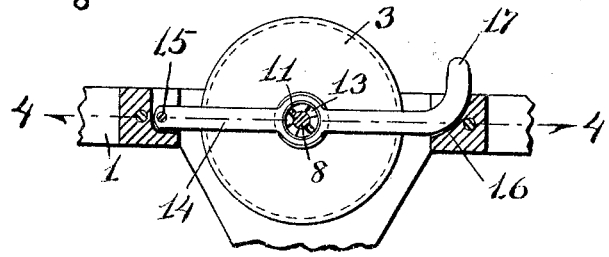
Figure 4:
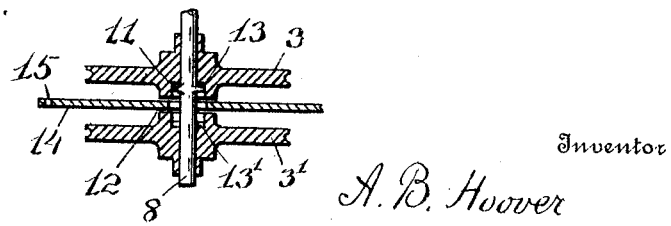

Figure 1 is a side view of the invention. Fig. 2 is a plan view of the same. Fig. 3 is a section on the line 3—3, Fig. 2. Fig. 4 is a fragmentary sectional view taken on the line 4—4, Fig. 3.

The invention has relation to machines for rewinding the films of motion picture machines, having for its principal object to provide means for rewinding in either direction from a single operating mechanism or shaft.

The invention consists in the novel construction and combinations of parts, as hereinafter set forth.

In the accompanying drawings illustrating the invention, the numeral 1, designates the frame, wherein are mounted the reel-shafts 2, 2, carrying the film reel in the usual manner.

Located centrally of the reel-shafts are driving wheels 3, 3, having journal bearings in the frame at 4, said wheels having driving connections 5, 5, with the reel-shafts, a belt drive being preferred, the smaller belt wheels being located upon shafts 6, 6, mounted in the frame adjacent to the reel-shafts 2, 2, and having gear connections 7, 7, between the shafts to enable the rewinding to be more rapidly accomplished.

Located centrally of the large belt wheels 3, 3, and engaging perforations of said wheels is a shaft 8, having sliding adjustment within said perforations. Upon adjustment endwise of this shaft in one direction, which is conveniently accomplished by means of the crank handle 9, for turning the shaft, it is designed that a driving connection shall be established between the shaft and one of the large wheels 3, 3, and upon adjustment of the shaft in the opposite direction, it is designed that a clutch connection shall be established between the shaft and the other of said wheels. To this end, the shaft is preferably provided with a radial projection or projections 11, normally located in the interval 12, between the large wheels 3, 3, and when the shaft is adjusted as stated, these projections engage seats 13, 13, of the wheel hubs, to establish the clutch or driving connection.

When the shaft is being turned in one direction to wind the film upon a reel on one of the reel-shafts, the other of the reel-shafts 2, 2, not driven directly by the shaft, runs as an idler, and in order that the film shall be checked from unwinding too fast, brake means are provided, being preferably a lever 14, located centrally of the wheels 3, 3, said lever being pivoted at one end to the frame at 15, and resting at its other or free end in a seat 16, of the frame, this free end having an upturned handle portion 17, by which pressure may be readily exerted upon the lever to press it to either side into engagement with either of the wheels 3, 3, to check the rotation thereof and of the reel upon the reel-shaft from which the film is being unwound.

What I claim is:

1. Means for rewinding the films of moving picture machines, having driven shafts for the film reels, comprising separate means for driving each of said reel-shafts, a single means including a driver shaft parallel with the driven shafts and adapted for engagement with either of the separate means to turn either of the reel-shafts, and single braking means having engagement with either of the separate means to prevent either of the reel-shafts from turning too rapidly.

2. Means for rewinding the films of moving picture machines, having driven shafts for the film reels, comprising separate means for driving each of said reel-shafts including wheels located centrally of said reel-shafts, an endwise adjustable shaft parallel with the driven shafts and engaging perforations of said wheels and having a single clutch member engaging with either of said wheels to turn either of the reel-shafts.

3. Means for rewinding the films of moving picture machines, having driven shafts for the film reels, comprising separate means for driving each of said reel-shafts including adjacent wheels located centrally of said reel-shafts, a short central endwise adjustable shaft parallel with the driven shafts and engaging perforations of said wheels and having a single clutch member engaging with either of said wheels to turn either of the reel-shafts, and a single brake lever located between said wheels and having braking engagement with either wheel.

In testimony whereof I affix my signature, in presence of two witnesses.

ARCHIE B. HOOVER.

Witnesses:
J. W. PECK,
FRANK J. MERRILL.

Copies of this patent may be obtained for five cents each, by addressing the "Commissioner of Patents, Washington, D. C."